Figures 1, 2:
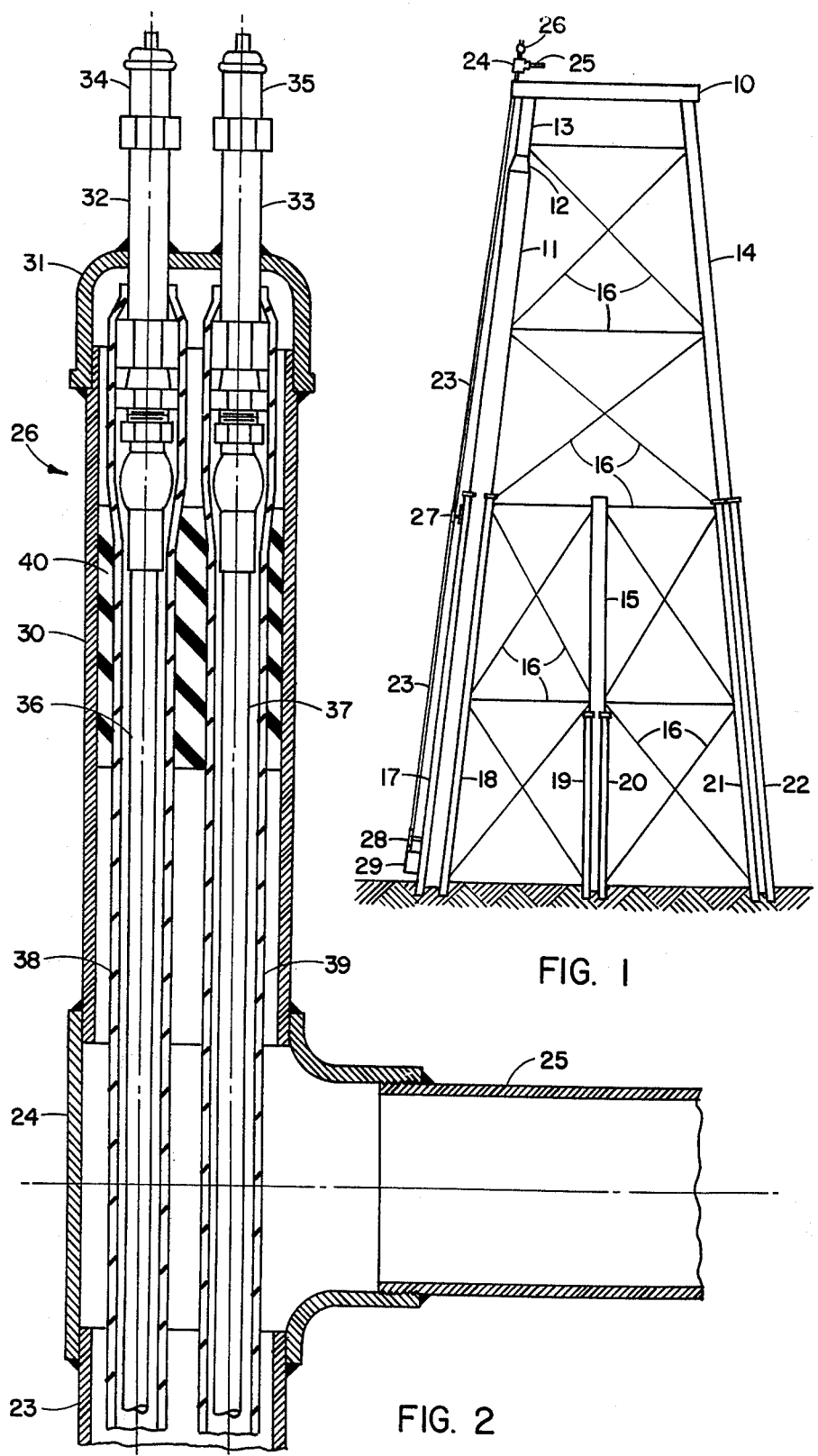

United States Patent [19]

Britton et al.

[11] 4,009,581
[45] Mar. 1, 1977

[54] GROUT LINE PROTECTED PRESSURE LINES FOR SETTING SLEEVE PACKERS

[75] Inventors: Frederick G. Britton, Bedford; Don B. Landers, Arlington, both of Tex.

[73] Assignee: Oil States Rubber Company, Arlington, Tex.

[22] Filed: May 19, 1975

[21] Appl. No.: 578,632

[52] U.S. Cl. .................................. 61/99; 61/53.58; 61/53.52; 61/100
[51] Int. Cl.² .......................... E02D 5/14
[58] Field of Search ............ 61/46.5, 46, 63, 53.58, 61/53.52; 166/179; 277/128

[56] References Cited
UNITED STATES PATENTS

| 2,236,682 | 4/1941 | Gross | 61/53.58 X |
| 2,775,095 | 12/1956 | Harris | 61/53.58 X |
| 3,468,132 | 9/1969 | Harris | 61/63 |
| 3,665,717 | 5/1972 | Sweeney et al. | 61/39 |
| 3,868,826 | 3/1975 | Landers | 61/46.5 |

Primary Examiner—Dennis L. Taylor
Attorney, Agent, or Firm—Warren H. Kintzinger

[57] ABSTRACT

An offshore deep water marine platform system having pressure feed lines extended from the platform deck to inflatable piling sleeve packers run inside grout supply lines.

12 Claims, 4 Drawing Figures

U.S. Patent  Mar. 1, 1977  Sheet 1 of 3  4,009,581

GROUT LINE PROTECTED PRESSURE LINES FOR SETTING SLEEVE PACKERS

This invention relates in general to offshore marine platform structures utilizing inflatable packers for sealing the annulus between a piling and its piling sleeve, and more particularly to an improved protection system for flexible packer inflation lines.

In erecting an offshore marine platform structure, the practice generally is to fabricate the platform structure on land, seal the hollow leg and brace members, and then tow it to the desired site, for installation-using the sealed leg members as flotation pontoons. Then, the leg members are flooded at controlled rates, to erect the platform structure. A typical method for securing the structure to the floor of the offshore site is by driving piles into the floor, through piling guide sleeves mounted on the legs. The pile is then made unitary with the sleeve through which it passes by filling the annulus between the pile and the sleeve with a grouting material such as concrete. After the pile is driven into place, and prior to filling the annulus with grout, a sleeve packer may typically be inflated to seal the annulus. Such an inflatable packer is described in U.S. Pat. No. 3,468,132, for example, assigned to the assignee of this invention. One commonly used practice is to run individual inflation lines from the platform deck down to each individual packer, usually along the outside of a leg. It is important that these inflation lines sustain no damage during platform installation. The process of piling the structure to the offshore floor imparts shock forces and vibration to the entire platform, and if rigid inflation lines are utilized, the rigid lines are particularly susceptible to vibration cracking. If flexible inflation lines are used, they have a shock absorbency advantage, but these lines are fragile and are easily cut or crushed. To make use of the shock absorbency advantage inherent in flexible lines, but to protect such lines from installation damage, flexible inflation lines are placed inside rigid protector pipes. Such a system is described, for example, in U.S. Pat. No. 3,868,826, assigned to the assignee of this invention. However, such a system requires an expensive and complex system of protective piping for the inflation lines. Typically, rigid piping already exists that extends to each sleeve in the form of supply piping for grout material. Thus, implementation of line placement within grout supply piping is desired to protect the flexible packer inflation lines.

It is therefore a principal object of this invention to provide protection for flexible inflation lines extending from an offshore marine platform deck to inflatable packers at the piling sleeves thereof.

Another object is to provide such protection utilizing existing grout supply lines.

Features of this invention useful in accomplishing the above objects include, in combination, a rigid pipe for transporting grouting material to fill the annulus between a pile and its guide sleeve, and a flexible packer inflation line interior to the pipe. If upper and lower packer assemblies are utilized on the same sleeve, the inflation lines for both of these packers may be run inside the same grout supply line—the lower end of which is sealed to prevent pumping the grout material into the water. Inflation lines exit the grout supply line through seal members, providing still further inflation line protection.

Figure 3:
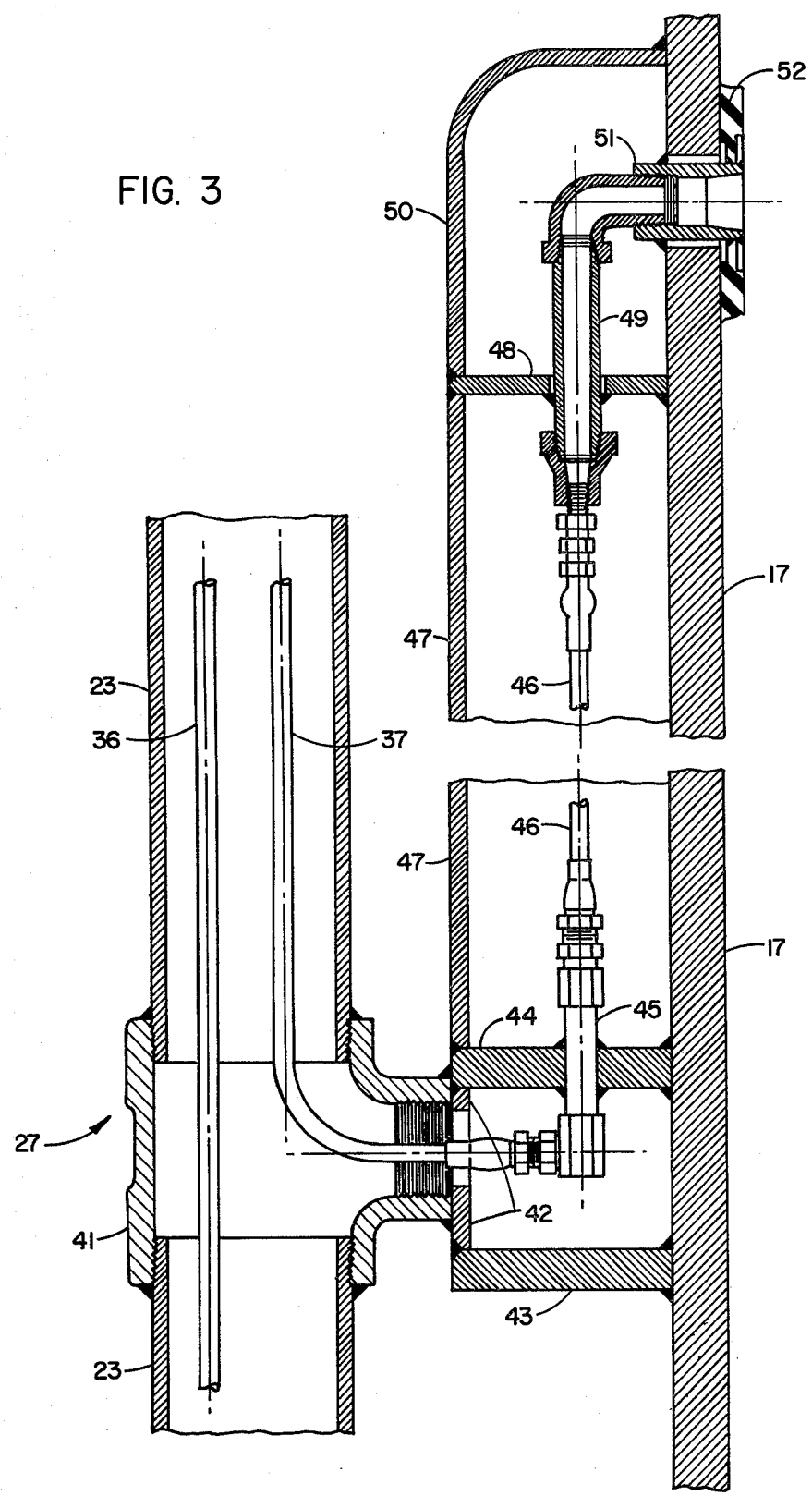
Figure 4:
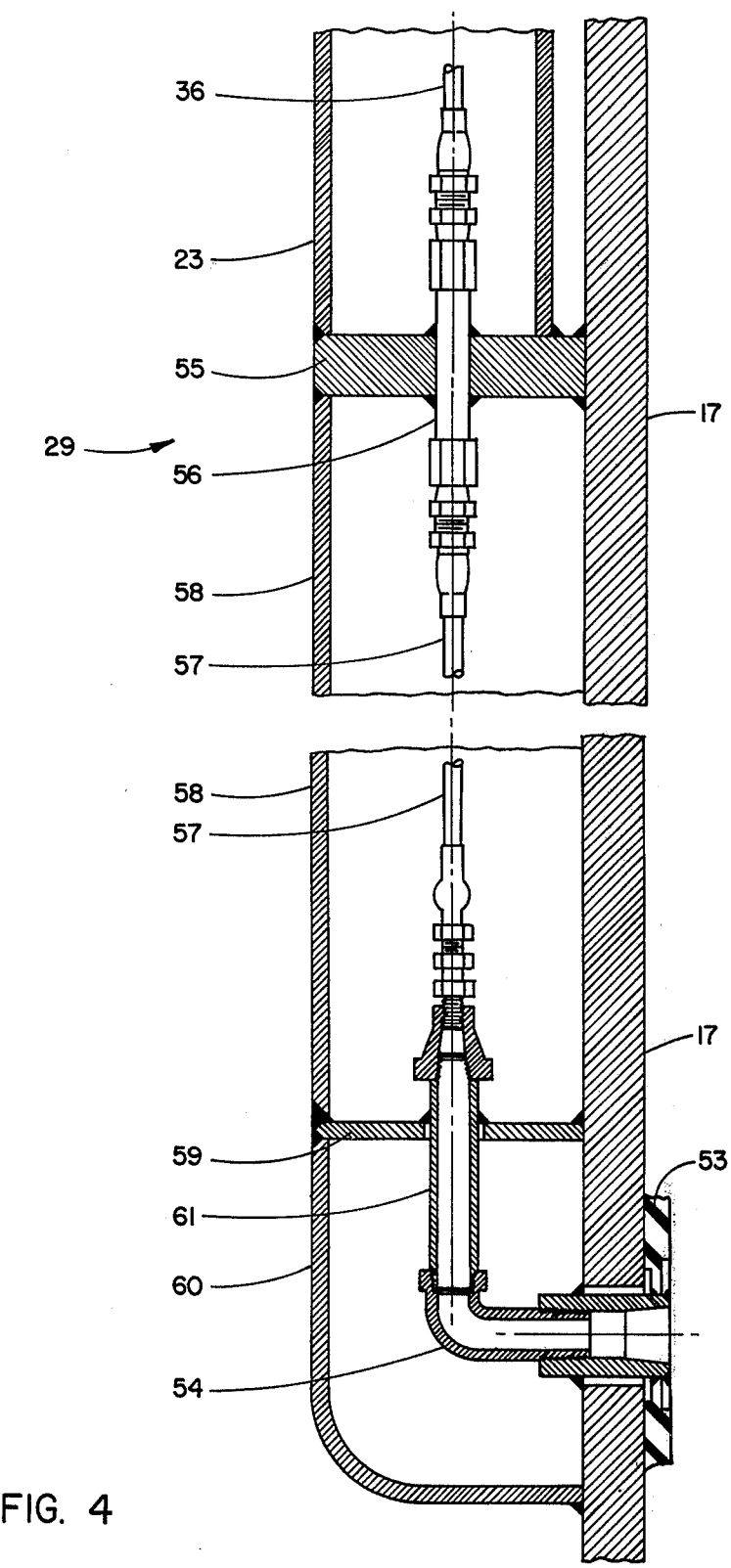

A specific embodiment representing what is presently regarded as the best mode of carrying out the invention is illustrated in the accompanying drawings. In the drawings:

FIG. 1 represents an elevation view of an offshore marine platform structure showing a grout supply pipe containing packer inflation lines and extending from the platform deck to a pile guide sleeve;

FIG. 2, a cross-sectional view of the upper hose connection assembly at the platform deck;

FIG. 3, a cross-sectional view of the connection assembly at the upper sleeve packer; and FIG. 4, a cross-sectional view of the connection assembly at the lower sleeve packer. Referring to the drawings:

The platform structure of FIG. 1 is equipped with a number of downwardly extending legs, supporting deck 10 at the top thereof. A large diameter leg 11, at the left, extends from the bottom of the structure to the top, almost, thereof; with, just below the waterline, the diameter decreasing through conical section 12 to a smaller diameter leg section 13, extending upwardly to deck 10. To the right, a smaller diameter leg 14 extends from deck 10 to the bottom of the structure; and, in the center, leg 15—which is smaller in diameter than leg 11—extends from the bottom of the structure, up through the first several frames, generally referred to by the reference number 16, which brace the structure. It is to be understood that the platform structure illustrated in FIG. 1 merely is illustrative of a large number of different platforms supported on one or more legs. The large diameter legs such as leg 11 are positioned on the left side of the platform, as shown in FIG. 1, and are of a larger diameter so that, sealed at the ends thereof, these legs function as pontoons for floating the platform structure to the installation site, whereupon these legs are then flooded at controlled rates to erect the platform structure. Toward the lower end of each of the platform legs there are one or more piling guide sleeves 17, 18, 19, 20, 21, and 22. Piles (not shown), one within each of the guides 17 through 22, are driven into the offshore bottom, anchoring the platform structure thereto. The pile outer diameter is smaller than the inner diameter of its respective guide, so that an annular space is formed therebetween. After a pile is driven, this annular space is sealed by means of an inflatable packer assembly such as described in the aforementioned U.S. Pat. No. 3,468,132, and the sealed annulus is filled with a grout material such as concrete. The grout material is pumped from the deck 10 down through a line 23 (only one of which is shown, for the sake of clarity). In accordance with the principles of this invention, inflation lines for the inflatable packers that seal the annulus of piling guide 17 are run within grout line 23, as will hereinafter be described.

Line 23 illustratively terminates on deck 10 with a T-fitting 24 connected to pipe 25 through which grout material for filling the piling sleeve annulus is pumped from a grout source not shown in the drawing. Referring also to FIG. 2, T-fitting 24 is connected also to upper hose connection assembly 26 that includes the packer inflation line connections for the sleeve packers of piling guide 17. Connection assembly 26 is connected through control valves, to a pressure source (detail not shown) such as a cylinder of compressed nitrogen gas. Proceeding down pipe 23, also connected to T-fitting 24, from deck 10, upper packer connection assembly 27 provides egress for the inflation line connected to the upper sleeve packer, and is constructed to prevent grout material being pumped therethrough. At a lower position on pipe 23—down from connection assembly 27—T-fitting 28 connects pipe 23 to the piling sleeve annulus within piling guide 17, thereby enabling grout material pumped through pipe 25 to fill the piling sleeve annulus. Pipe 23 terminates in lower packer connection assembly 29 that seals the end of pipe 23 against grout flow, yet provides egress for the lower packer inflation line.

As detailed in FIG. 2, upper hose connection assembly 26 includes a section of pipe 30, connected to T-fitting 24, and capped by cap member 31. In the illustrative embodiment and discussion that follows, it is assumed that the inflation hoses for both the upper and lower sleeve packers are installed within a single grout line. If only one packer is utilized in a system, it is expressly understood that a single hose would be contained within the grout line, and that the equipment would be modified to that end. The pipe cap 31 of FIG. 2 has two openings therein through which pipe nipples 32 and 33 are inserted and welded in place. Nipples 32 and 33 terminate in quick-disconnect plugs 34 and 35, to which, when desired, supply lines of pressurized air or gas may be selectively attached. The ends of nipples 32 and 33, interrior to upper hose connection assembly 26, are connected through suitable male and female connectors and fittings, to flexible hoses 36 and 37, respectively, which carry the supply of pressurized gas to the inflatable sleeve packers, in a manner to be described hereinafter. Reinforced protector sleeves 38 and 39 cover hoses 36 and 37—and their respective connections to nipples 32 and 33—from the region inside pipe cap 31, to a point below T-fitting 24, to provide protection for hoses 36 and 37 in the area most vulnerable to abrasive damage by the grouting material entering pipe 23 from pipe 25. Sleeves 38 and 39 extend from below T-fitting 24 to a region of reduced abrasive damage from the entering grouting material. Packing gland, or plug, 40, typically constructed of urethene material, holds hoses 36 and 37 in spaced relation from each other and from the walls of pipe 30.

Referring to FIG. 3, hoses 36 and 37 continue down multi-section grout line 23 to upper packer connection assembly 27. Connection assembly 27 includes T-fitting 41, interconnecting pipe sections of line 23. Hose 36 continues through T-fitting 41 and down grout line 23, whereas hose 37 exits grout line 23 through the stem of T-fitting 41. The steam leg of T-fitting 41 through which hose 37 exits is terminated in a weld connection to a half-section of pipe 42 that, in turn, is welded to piling guide 17. The lower end of half-pipe 42 is sealed by a steel plate 43, and the upper end of half-pipe 42 is sealed by a steel plate 44, with nipple 45 extended through and welded in place to plate 44. The lower end of nipple 45 is connected to hose 37, and the upper end of nipple 45 is connected to hose 46. Hose 46 is contained within a half-section of pipe 47, welded to plate 44 and piling guide 17. Plate 48, terminating half-pipe 47 at the top, is equipped with a through-nipple 49, connected to hose 46. A half-section bull plug 50, welded to the top of plate 48 and piling guide 17, encloses an elbow stud connection 51, from nipple 49 to inflatable packer 52. It is thus seen that an airtight connection exists between quick-disconnect plug 35 on platform deck 10, through hose line 37 in grout line 23, and fittings, to upper inflatable packer 52, with grout line 23 being effectively sealed to prevent grout leakage therefrom.

Similarly, for lower sleeve packer 53, an airtight connection exists from quick disconnect plug 34, through hose line 36 in grout line 23, to the packer spud connection assembly 54. To prevent grout material from leaving pipe 23, a steel plate 55 is welded to the bottom of pipe 23 as a bottom end termination therefor. A nipple section 56 passes through a hole in plate 55 and is welded therein, and suitable connections therewith provide a continuation of hose 36 to hose 57. Half-section pipe 58, welded to plate 55 and piling guide 17, providing a protective enclosure around the flexible hose 57, is terminated by plate 59 which, in turn, is capped by a half-section of bull plug 60 in substantially the same manner as is the connection to the upper packer assembly. Hose 57 is connected to packer elbow stud connection 54 through connections to nipple 61, passed through a hole in plate 59, and welded in place.

Illustratively, grout supply pipe 23 is three-inch pipe; and the half-sections of pipe and bull-plugs (such as pipe sections 42, 47, and 58, and bull-plug sections 50 and 60) are split, 8-inch pipes and bull-plugs, respectively. Plates 43, 44, 48, 55, and 59 are basically semicircular with 8-inch diameters.

It shall be noted that in the event two packers (upper and lower) are used, some means such as a grout return line (not shown) extending from the annulus to deck 10 must be provided for pressure relief on the sleeve-piling annulus when it is filled with grout. Grout material is then pumped down line 23 until it comes out of the return line at deck 10, to ensure that the grout material completely fills the annulus. It is understood that such a return line may be utilized to protect the inflation lines, without departing from the scope of this invention.

In order to pull a flexible inflation line through the grout line, a rubber pig with a length of rope tied to it is inserted into the pipe. The rope extends through a urethane plug inside the pipe, and the plug is held in place. Compressed air is introduced into the pipe between the pig and the plug; the plug providing a seal so that the pig is forced down the pipe, pulling the rope. When the pig exits the distant end of the pipe, the flexible hose line may be attached to the rope and pulled through the pipe.

Thus, in accordance with the principles of this invention, there has been provided, in cooperation with the grout line 23 of a piling guide 17, a protection system for the flexible packer inflation lines. A significant saving is realized because no additional protection piping is required. Reliability is assured with the inflation lines protected and the grout line seals maintained. Alternatively, it is understood that inflation hose protection lines, such as those described in the aforementioned U.S. Pat. No. 3,868,826, may be adapted to carry grout material to the piling sleeves. Please note further that rigid pressure feed lines may be run within grouting material lines in place of flexible hose line in the attainment thereby of protection therefor, much the same as with flexible packer inflation lines.

Whereas this invention has been described with respect to a single embodiment thereof, it should be realized that various changes may be made without departing from the essential contributions to the art made by the teachings hereof.

We claim:

1. In an offshore marine structure of the type having a platform deck supported by one or more legs extending from the platform deck to the water body bottom, said legs having piling guide sleeves mounted thereon and adapted to receive piling driven therethrough into the bottom for anchoring the structure, said sleeves having inflatable packer assemblies mounted therein and adapted to be inflated to seal the annulus formed between each sleeve and its pile prior to the annulus being filled with grouting material, said platform deck having therein grouting material supply means and packer inflation pressure supply means, improved apparatus for connecting the grouting material supply means to a sleeve annulus and connecting the packer inflation supply means to the inflatable packer assembly associated with said sleeve including: rigid pipe means extending from the platform deck down to said sleeve; pressure conduit means inside said pipe means; first coupling means exiting said pipe means at said platform deck for coupling one end of said conduit means to said packer inflation supply means; second coupling means exiting said pipe means for coupling the other end of said conduit means to said associated packer assembly; first grouting supply coupling means for coupling said pipe means to said grouting material supply means; and grouting feed coupling means for coupling said pipe means to said annulus.

2. The improved apparatus of claim 1, with first sealing means in the vicinity of said first coupling means for sealing said pipe means.

3. The improved apparatus of claim 2, with second sealing means in the vicinity of said second coupling means for sealing said pipe means.

4. The improved apparatus of claim 3, further including enclosure means connected to said second sealing means for enclosing said second coupling means.

5. The improved apparatus of claim 3, wherein said second sealing means includes a plate having an opening therethrough; and said second coupling means includes a pipe nipple section positioned in said opening and welded to said plate.

6. The improved apparatus of claim 5, further including a split pipe section, of larger diameter than said pipe means, terminated by a split bull plug; said split pipe section being welded to said plate and said sleeve, said split bull plug being welded to said sleeve; and with said split pipe section and said split bull plug in cooperative relation with said sleeve for enclosing said second coupling means.

7. The improved apparatus of claim 1, wherein said pressure conduit means is flexible hose means.

8. The improved apparatus of claim 7, further including sleeve means covering said hose means in the vicinity of said first grouting supply coupling means.

9. The improved apparatus of claim 1, further including plug means inside said pipe means in the vicinity of said first coupling means; and with said plug means having opening means therethrough adapted to hold said pressure conduit means.

10. The improved apparatus of claim 1, wherein said sleeve has additional inflatable packer assemblies associated therewith and the apparatus includes additional coupling means, and additional sealing means associated with each of the additional packer assemblies.

11. In a pile and pile guide structure: a pile guide sleeve adapted to receive a pile driven therethrough with an annulus formed between the sleeve and its pile; inflatable packer assembly means mounted in said sleeve and adapted to be inflated to seal the annulus formed between each sleeve and its pile; rigid conduit grouting material supply means mounted to the exterior of said sleeve; connection means connecting said rigid conduit grouting material supply means to said annulus for the delivery of grouting material thereto; and pressure supply means connected for inflating said inflatable packer assembly means including a run of pressure line means enclosed within said rigid conduit grouting material supply means.

12. The pile and pile guide structure of claim 11, wherein said run of pressure line means enclosed within said rigid conduit grouting material supply means is a run of rigid piping.

* * * * *